J. E. PETTIT.
SOLDERING TOOL.
APPLICATION FILED DEC. 15, 1908.
953,920.
Patented Apr. 5, 1910.
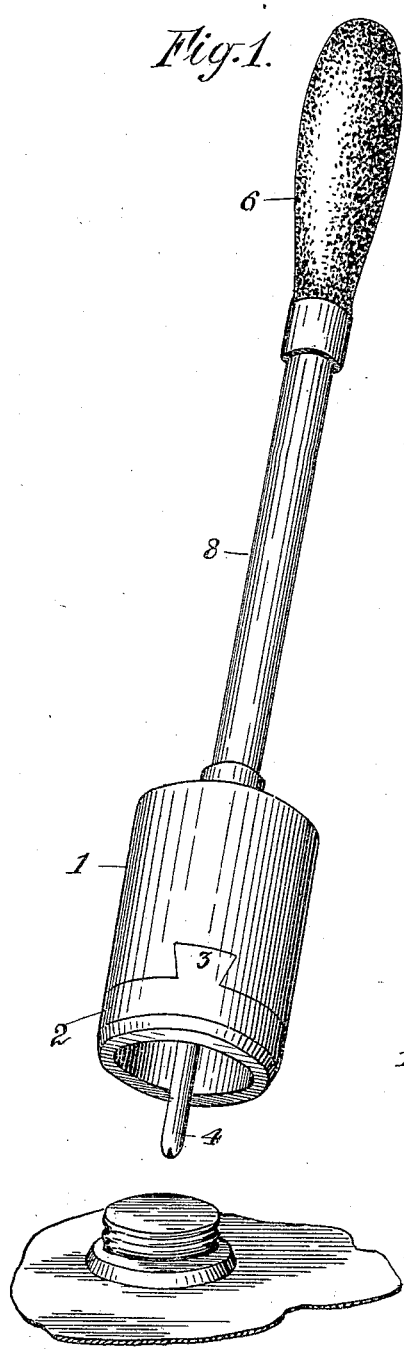
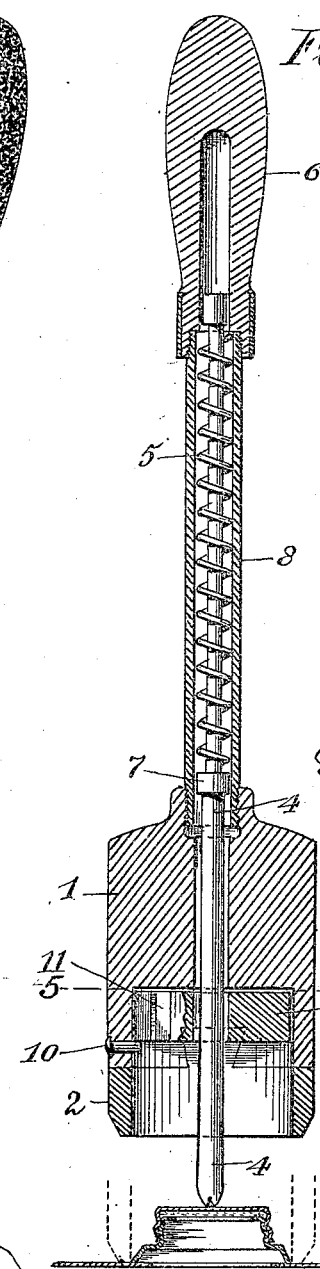
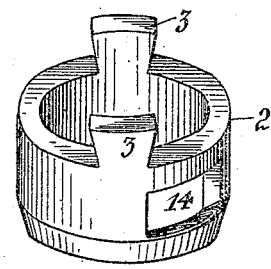
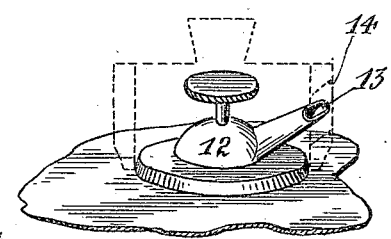
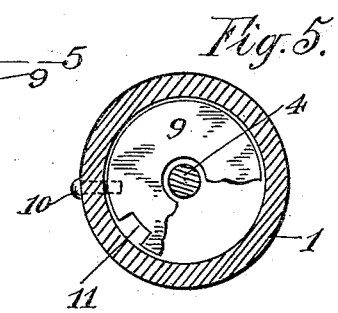
Witnesses,
Inventor,
Jonathan E. Pettit,
By
Attorneys

UNITED STATES PATENT OFFICE.

JONATHAN E. PETTIT, OF LOS ANGELES, CALIFORNIA, ASSIGNOR OF ONE-HALF TO WILLIAM W. KNIGHTEN, OF LOS ANGELES, CALIFORNIA.

SOLDERING-TOOL.

953,920.   Specification of Letters Patent.   Patented Apr. 5, 1910.

Application filed December 15, 1908. Serial No. 467,602.

*To all whom it may concern:*

Be it known that I, JONATHAN E. PETTIT, a citizen of the United States, residing at Los Angeles, in the county of Los Angeles and State of California, have invented new and useful Improvements in Soldering-Tools, of which the following is a specification.

It is of the objects of my device to provide a soldering tool which is particularly adapted for soldering covers or caps which are round in general outline on cans or other receptacles, the tool being specially adapted for use with one hànd and for soldering nozzles having projecting spouts. I accomplish these objects by means of the tool described herein and illustrated in the accompanying drawings, in which:—

Figure 1— is a perspective view of my soldering tool in place over a circular screw cap preparatory to soldering the base for the screw cap on the can, a fragment only of the receptacle being shown. Fig. 2— is a central vertical longitudinal section thereof in position ready to be pushed downwardly into place. Fig. 3— is a perspective view of a copper shoe adapted for placement on the body portion of the soldering tool. Fig. 4— is a modified form of a discharge nozzle for the can or other receptacle. Fig. 5— is a plan taken on line 5—5 of Fig. 2.

In the drawings the body portion 1 is preferably made of iron instead of copper for economical reasons and has detachably secured to its lower end a copper shoe 2. This shoe is secured to the body of the tool by means of the dove-tail projections 3 thereon, said tool having sockets for the reception thereof in the body portion. To detachably hold the copper shoe in place on the tool I have provided a removable holding ring 9 having a central bore for placement on the plunger 4. This ring is of slightly less diameter than the central socket in the body of the tool and is held therein by the rivet 10 which projects into the socket and forms a stop to hold the ring in place in the socket, a vertical recess 11 being provided in the ring to permit it to enter the socket when the recess registers with the inwardly projecting end of the rivet. After the ring has passed the rivet, it is slightly rotated, until the recess has passed beyond the rivet when the ring will be held securely in place, and the upwardly projecting dove-tails 3 on the shoe will rest against the periphery of the ring and prevent the removal of the shoe from the tool. Extending longitudinally through the body of the tool is a spring pressed plunger 4. This plunger normally extends below the bottom of the shoe when in place and is held in this extended position by means of the coiled spring 5. This plunger will hold in place the article to be soldered to the can or other receptacle as shown in Fig. 2. When the plunger is put in place in central position of the part to be soldered to the can, it will hold the same spring pressed in position while the soldering iron is moved into place for soldering, as shown in dotted lines in Fig. 2. The spiral spring encircles the stem and rests at its lower end on the ring 7 secured rigidly to the plunger stem forming an abutment therefor. The upper end of the spiral spring bears against handle 6 of the tool. By this construction it will be manifest that the lower end of the plunger 4 can be placed upon the article to be soldered and the soldering iron can be pressed downwardly into place by the hand having hold of the handle 6, the other hand of the operator being free for applying acid, solder or otherwise doing what is needful. The tool can be disassembled by unscrewing handle 6 from the hollow shank 8, the top of the shank being screw threaded for that purpose. When the handle is removed the plunger 4 can be moved out bodily from the tool and the hollow shank can be moved from the main body by unscrewing the same.

In practice it often becomes necessary to solder onto cans adjustable nozzles 12 as shown in Fig. 4. These nozzles have a projecting discharge spout 13 which prevents the placement thereover of the usual circular soldering iron, to provide for which I have placed in the detachable copper shoe (Fig. 3) an opening 14 adapted to receive the discharge spout 13. This will adapt the soldering iron for use in soldering nozzles having projecting discharge spouts.

Having described my invention what I claim as new and desire to secure by Letters Patent is:—

1. In a soldering tool, the combination of a body portion carrying a detachable soldering shoe, means to lock said shoe in position on the body portion, a cylindrical handle for said body portion, and a spring pressed plunger mounted in said handle, said plunger adapted to project outwardly beyond the shoe.

2. In a soldering tool, a main body portion having a chamber therein and provided with sockets adapted to receive projections, a soldering copper provided with projections adapted to engage in said sockets, and means located within said chamber to lock said copper in position.

3. In a soldering tool, the combination of a body portion having a copper shoe in locked engagement therewith, means to maintain said shoe in locked engagement with said body portion, a handle secured to said body portion, and a spring pressed plunger centrally mounted in said handle, the lower end of said plunger being normally projected beyond said shoe.

4. In a soldering tool, the herein described means to secure the soldering shoe to the main body portion, comprising a main body portion having a central socket therein for the reception of a holding ring, the body portion being provided with projection receiving sockets in the downwardly projecting walls of the body portion, a circular holding ring for placement in the central socket having a central bore therein and adapted to be placed on the stem of the tool, the said ring being provided with a vertical recess in the periphery thereof to provide clearance for the inwardly projecting end of a holding rivet, a holding rivet projecting inwardly into the path of the ring in passing into the socket and adapted to hold the ring in place in the socket in the body portion, a soldering shoe having upwardly projecting dove-tail projections adapted to enter the sockets in the body portion.

5. In a soldering tool, a detachable soldering shoe having means for securing the shoe to the tool, the shoe being provided with an aperture for the reception of a spout on the articles to be soldered.

In witness that I claim the foregoing I have hereunto subscribed my name this 9th day of December, 1908.

JONATHAN E. PETTIT.

Witnesses:
HENRY T. HAZARD,
EDMUND A. STRAUSE.